(12) United States Patent
Lloyd et al.

(10) Patent No.: US 7,363,367 B2
(45) Date of Patent: Apr. 22, 2008

(54) SYSTEMS AND METHODS FOR ROBUST, REAL-TIME MEASUREMENT OF NETWORK PERFORMANCE

(75) Inventors: Michael A. Lloyd, San Carlos, CA (US); Sean P. Finn, Belmont, CA (US); Omar C. Baldonado, Palo Alto, CA (US); Mansour Karam, Mountain View, CA (US); Faisal Siddiqi, San Mateo, CA (US); Herbert S. Madan, Tiburon, CA (US); James G. McGuire, San Francisco, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 721 days.

(21) Appl. No.: 09/903,423

(22) Filed: Jul. 10, 2001

(65) Prior Publication Data

US 2002/0129161 A1    Sep. 12, 2002

Related U.S. Application Data

(60) Provisional application No. 60/241,450, filed on Oct. 17, 2000, provisional application No. 60/275,206, filed on Mar. 12, 2001.

(51) Int. Cl.
    *G06F 15/173* (2006.01)
(52) U.S. Cl. ............... 709/224; 709/227; 709/232; 709/238
(58) Field of Classification Search ........... 709/223, 709/224, 227, 238, 203, 232
    See application file for complete search history.

(56) References Cited

U.S. PATENT DOCUMENTS 4,284,852 A    8/1981    Szybicki et al. ........ 179/18 EA (Continued)

FOREIGN PATENT DOCUMENTS

EP    0 504 537    3/1991

(Continued)

OTHER PUBLICATIONS

Papadopoulos, Constantinos V., et al., "Protection and Routing Algorithms for Network Management", *Microprocessing and Microprogramming*, Sep. 1993, vol. 38, pp. 163-169.

(Continued)

*Primary Examiner*—David Wiley
*Assistant Examiner*—Phuoc H Nguyen
(74) *Attorney, Agent, or Firm*—Haverstock & Owens, LLP

(57) ABSTRACT

Methods and apparatuses for obtaining delay, jitter, and loss statistics of a path between server and an end user coupled via an internetwork are described. The server may comprise a web server in communication with the end user via the Internet. Statistics are obtained by analyzing the details of a TCP connection underlying an HTML transaction. Robust measurements of jitter, delay, and loss are ensured by maximizing traffic between the web server and the surfer in order to generate a robust sample of TCP connections. Content may be updated with one or more html link(s). This existing content may reside on a highly trafficked portal, such as a web portal, and may be encoded in a markup language, such as Hyper Text Markup Language (HTML). The Uniform Resource Locators (URLs) corresponding to the one or more links resolve to the server from which the statistics are to be measured. The actual content supplied by the server may be minimized, in order to preserve bandwidth.

12 Claims, 2 Drawing Sheets

U.S. PATENT DOCUMENTS

| | | | |
|---|---|---|---|
| 4,345,116 A | 8/1982 | Ash et al. ............... 179/18 EA |
| 4,495,570 A | 1/1985 | Kitajima et al. ............ 364/200 |
| 4,594,704 A | 6/1986 | Ollivier ....................... 370/16 |
| 4,669,113 A | 5/1987 | Ash et al. ................... 379/221 |
| 4,704,724 A | 11/1987 | Krishnan et al. ........... 379/221 |
| 4,726,017 A | 2/1988 | Krum et al. ................... 370/85 |
| 4,748,658 A | 5/1988 | Gopal et al. ................ 379/221 |
| 4,788,721 A | 11/1988 | Krishnan et al. ........... 379/221 |
| 4,839,798 A | 6/1989 | Eguchi et al. .............. 364/200 |
| 4,920,432 A | 4/1990 | Eggers et al. .............. 360/33.1 |
| 4,931,941 A | 6/1990 | Krishnan ..................... 364/437 |
| 4,939,726 A | 7/1990 | Flammer et al. ........... 370/94.1 |
| 4,949,187 A | 8/1990 | Cohen ........................ 358/335 |
| 4,949,248 A | 8/1990 | Caro ........................... 364/200 |
| 5,142,570 A | 8/1992 | Chaudhary et al. ......... 379/221 |
| 5,172,413 A | 12/1992 | Bradley et al. ............... 380/20 |
| 5,253,341 A | 10/1993 | Rozmanith et al. .......... 395/200 |
| 5,287,537 A | 2/1994 | Newmark et al. .......... 395/800 |
| 5,291,554 A | 3/1994 | Morales ......................... 380/5 |
| 5,341,477 A | 8/1994 | Pitkin et al. ................ 395/200 |
| 5,361,256 A | 11/1994 | Doeringer et al. |
| 5,371,532 A | 12/1994 | Gelman et al. ................ 348/7 |
| 5,375,070 A | 12/1994 | Hershey et al. |
| 5,406,502 A | 4/1995 | Haramaty et al. ..... 364/551.01 |
| 5,410,343 A | 4/1995 | Coddington et al. ........... 348/7 |
| 5,414,455 A | 5/1995 | Hooper et al. ................. 348/7 |
| 5,442,389 A | 8/1995 | Blahut et al. ................... 348/7 |
| 5,442,390 A | 8/1995 | Hooper et al. ................. 348/7 |
| 5,442,749 A | 8/1995 | Northcutt et al. ...... 395/200.09 |
| 5,452,294 A | 9/1995 | Natarajan ..................... 370/54 |
| 5,467,345 A | 11/1995 | Cutler, Jr. et al. ............ 370/60 |
| 5,471,622 A | 11/1995 | Eadline ....................... 395/650 |
| 5,471,623 A | 11/1995 | Napolitano, Jr. ....... 395/200.03 |
| 5,475,615 A | 12/1995 | Lin ............................ 364/514 |
| 5,477,536 A | 12/1995 | Picard ......................... 370/54 |
| 5,508,732 A | 4/1996 | Bottomley et al. ............. 348/7 |
| 5,515,511 A | 5/1996 | Nguyen et al. .......... 395/200.2 |
| 5,519,435 A | 5/1996 | Anderson ...................... 348/8 |
| 5,521,591 A | 5/1996 | Arora et al. ................. 340/826 |
| 5,528,281 A | 6/1996 | Grady et al. ................... 348/7 |
| 5,535,195 A | 7/1996 | Lee ............................ 370/54 |
| 5,537,394 A | 7/1996 | Abe et al. ..................... 370/17 |
| 5,563,875 A | 10/1996 | Hefel et al. .................... 370/15 |
| 5,574,938 A | 11/1996 | Bartow et al. ............... 395/800 |
| 5,629,930 A | 5/1997 | Beshai et al. ............... 370/396 |
| 5,631,897 A | 5/1997 | Pacheco et al. ............. 370/237 |
| 5,636,216 A | 6/1997 | Fox et al. .................... 370/402 |
| 5,654,958 A | 8/1997 | Natarajan ................... 370/410 |
| 5,659,796 A | 8/1997 | Thorson et al. ......... 395/200.71 |
| 5,668,800 A | 9/1997 | Stevenson ................... 370/248 |
| 5,675,741 A | 10/1997 | Aggarwal et al. ...... 395/200.12 |
| 5,729,528 A | 3/1998 | Salingre et al. ............. 370/230 |
| 5,754,547 A | 5/1998 | Nakazawa .................. 370/401 |
| 5,754,639 A | 5/1998 | Flockhart et al. ........... 379/221 |
| 5,787,253 A | 7/1998 | McCreery et al. ...... 395/200.61 |
| 5,793,976 A | 8/1998 | Chen et al. ............. 395/200.54 |
| 5,802,106 A | 9/1998 | Packer |
| 5,805,594 A | 9/1998 | Kotchey et al. ............ 370/401 |
| 5,812,528 A | 9/1998 | VanDervort ................ 370/235 |
| 5,835,710 A | 11/1998 | Nagami et al. .......... 395/200.8 |
| 5,841,775 A | 11/1998 | Huang ........................ 370/422 |
| 5,845,091 A | 12/1998 | Dunne et al. ............ 395/200.7 |
| 5,884,047 A | 3/1999 | Aikawa et al. ......... 395/200.68 |
| 5,935,216 A | 8/1999 | Benner et al. ............... 709/248 |
| 5,940,478 A | 8/1999 | Vaudreuil et al. ........ 379/88.18 |
| 5,944,779 A | 8/1999 | Blum ......................... 709/201 |
| 5,974,457 A | 10/1999 | Waclawsky et al. |
| 6,006,264 A | 12/1999 | Colby et al. ................ 709/226 |
| 6,009,081 A | 12/1999 | Wheeler et al. ............ 370/255 |
| 6,012,088 A | 1/2000 | Li et al. ...................... 709/219 |
| 6,026,441 A * | 2/2000 | Ronen ........................ 709/227 |
| 6,034,946 A | 3/2000 | Roginsky et al. |
| 6,052,718 A | 4/2000 | Gifford ....................... 709/219 |
| 6,069,889 A | 5/2000 | Feldman et al. ............ 370/351 |
| 6,078,963 A | 6/2000 | Civanlar et al. ............ 709/238 |
| 6,108,703 A | 8/2000 | Leighton et al. ........... 709/226 |
| 6,111,881 A | 8/2000 | Soncodi ...................... 370/395 |
| 6,119,235 A * | 9/2000 | Vaid et al. .................. 713/201 |
| 6,130,890 A | 10/2000 | Leinwand et al. .......... 370/400 |
| 6,167,052 A | 12/2000 | McNeil et al. .............. 370/399 |
| 6,173,324 B1 | 1/2001 | D'Souza .................... 709/224 |
| 6,178,448 B1 | 1/2001 | Gray et al. .................. 709/224 |
| 6,185,598 B1 | 2/2001 | Farber et al. ............... 709/200 |
| 6,185,601 B1 | 2/2001 | Wolff ......................... 709/203 |
| 6,189,044 B1 | 2/2001 | Thomson et al. ........... 709/242 |
| 6,226,266 B1 | 5/2001 | Galand et al. |
| 6,275,470 B1 | 8/2001 | Ricciulli |
| 6,282,562 B1 | 8/2001 | Sidi et al. |
| 6,286,045 B1 * | 9/2001 | Griffiths et al. ............. 709/224 |
| 6,292,832 B1 | 9/2001 | Shah et al. .................. 709/226 |
| 6,317,778 B1 | 11/2001 | Dias et al. ................... 709/214 |
| 6,339,595 B1 | 1/2002 | Rekhter et al. |
| 6,341,309 B1 * | 1/2002 | Vaid et al. .................. 709/223 |
| 6,415,323 B1 | 7/2002 | McCanne et al. |
| 6,426,955 B1 | 7/2002 | Gossett Dalton, Jr. et al. .......................... 370/401 |
| 6,434,606 B1 * | 8/2002 | Borella et al. .............. 709/231 |
| 6,438,592 B1 * | 8/2002 | Killian ....................... 709/224 |
| 6,446,028 B1 * | 9/2002 | Wang ......................... 702/186 |
| 6,452,950 B1 * | 9/2002 | Ohlsson et al. ............. 370/516 |
| 6,463,454 B1 * | 10/2002 | Lumelsky et al. .......... 709/223 |
| 6,522,627 B1 | 2/2003 | Mauger ...................... 370/230 |
| 6,526,056 B1 | 2/2003 | Rekhter et al. |
| 6,538,416 B1 | 3/2003 | Hahne et al. ............... 320/431 |
| 6,556,582 B1 | 4/2003 | Redi ........................... 370/443 |
| 6,601,098 B1 * | 7/2003 | Case et al. .................. 709/224 |
| 6,608,841 B1 | 8/2003 | Koodli |
| 6,611,872 B1 | 8/2003 | McCanne |
| 6,614,789 B1 | 9/2003 | Yazdani et al. ............. 370/392 |
| 6,625,648 B1 * | 9/2003 | Schwaller et al. .......... 709/224 |
| 6,631,419 B1 | 10/2003 | Greene |
| 6,633,640 B1 | 10/2003 | Cohen et al. |
| 6,661,797 B1 | 12/2003 | Goel et al. |
| 6,687,229 B1 | 2/2004 | Kataria et al. .............. 370/238 |
| 6,707,824 B1 | 3/2004 | Achilles et al. ............. 370/412 |
| 6,711,137 B1 | 3/2004 | Klassen et al. |
| 6,711,152 B1 | 3/2004 | Kalmanek, Jr. et al. .... 370/351 |
| 6,714,549 B1 | 3/2004 | Phaltankar |
| 6,728,484 B1 | 4/2004 | Ghani ........................ 398/42 |
| 6,728,777 B1 | 4/2004 | Lee et al. |
| 6,728,779 B1 | 4/2004 | Griffin et al. |
| 6,748,426 B1 * | 6/2004 | Shaffer et al. .............. 709/219 |
| 6,757,255 B1 * | 6/2004 | Aoki et al. .................. 709/203 |
| 6,760,775 B1 | 7/2004 | Anerousis et al. .......... 709/238 |
| 6,766,381 B1 | 7/2004 | Barker et al. |
| 6,795,399 B1 | 9/2004 | Benmohamed et al. |
| 6,795,860 B1 | 9/2004 | Shah ........................... 709/229 |
| 6,801,502 B1 | 10/2004 | Rexford et al. ............. 370/235 |
| 6,810,417 B2 | 10/2004 | Lee ............................. 709/220 |
| 6,819,662 B1 | 11/2004 | Grover et al. ............... 370/351 |
| 6,820,133 B1 * | 11/2004 | Grove et al. ................ 709/238 |
| 6,829,221 B1 | 12/2004 | Winckles et al. ........... 370/238 |
| 6,836,463 B2 | 12/2004 | Garcia-Luna-Aceves et al. ........................... 370/238 |
| 6,839,751 B1 | 1/2005 | Dietz et al. ................. 709/224 |
| 6,885,641 B1 | 4/2005 | Chan et al. |
| 6,909,700 B1 | 6/2005 | Benmohamed et al. |
| 6,912,222 B1 | 6/2005 | Wheeler et al. ........ 370/395.31 |
| 6,956,858 B2 | 10/2005 | Hariguchi et al. ...... 370/395.31 |
| 6,963,575 B1 | 11/2005 | Sistanizadeh et al. ....... 370/404 |
| 6,973,490 B1 * | 12/2005 | Robertson et al. .......... 709/224 |
| 6,981,055 B1 | 12/2005 | Ahuja et al. ................ 709/238 |
| 6,993,584 B2 | 1/2006 | Border et al. ............... 709/227 |
| 7,002,917 B1 | 2/2006 | Saleh |

| | | | |
|---|---|---|---|
| 7,020,086 B2 | 3/2006 | Juttner et al. | 370/238 |
| 7,043,541 B1 | 5/2006 | Bechtolsheim et al. | 709/223 |
| 7,043,562 B2 | 5/2006 | Dally et al. | 709/238 |
| 7,065,584 B1 | 6/2006 | Shavitt et al. | |
| 7,111,073 B1 | 9/2006 | Jain et al. | 709/241 |
| 7,123,620 B1 | 10/2006 | Ma | 370/395.32 |
| 2001/0010059 A1* | 7/2001 | Burman et al. | 709/224 |
| 2001/0026537 A1 | 10/2001 | Massey | 370/316 |
| 2001/0037311 A1 | 11/2001 | McCoy et al. | |
| 2002/0038331 A1 | 3/2002 | Flavin | |
| 2002/0087687 A1 | 7/2002 | Zaifman et al. | 709/225 |
| 2002/0124100 A1 | 9/2002 | Adams | 709/232 |
| 2002/0152318 A1 | 10/2002 | Menon et al. | 709/231 |
| 2003/0016770 A1 | 1/2003 | Trans et al. | 375/346 |
| 2003/0191841 A1 | 10/2003 | DeFerranti et al. | |
| 2005/0185654 A1 | 8/2005 | Zadikian et al. | 370/395.21 |
| 2005/0201302 A1 | 9/2005 | Gaddis et al. | 370/254 |

FOREIGN PATENT DOCUMENTS

| | | |
|---|---|---|
| EP | 0528 075 | 2/1993 |
| EP | 0 788 267 | 8/1997 |
| EP | 0 598 969 B1 | 2/1999 |
| EP | 0 942 560 | 9/1999 |
| EP | 0 977 456 A2 | 2/2000 |
| EP | 0 982 901 A1 | 3/2000 |
| EP | 0 999 674 A1 | 5/2000 |
| WO | 94/08415 | 4/1994 |
| WO | 99/06913 | 2/1999 |
| WO | 99/14907 | 3/1999 |
| WO | 99/14931 | 3/1999 |
| WO | 99/14932 | 3/1999 |
| WO | 99/18751 | 4/1999 |
| WO | 99/30460 | 6/1999 |
| WO | 99/39481 | 8/1999 |
| WO | 00/04458 | 1/2000 |
| WO | WO 00/25224 | 4/2000 |
| WO | WO 00/38381 | 6/2000 |
| WO | 00/45560 | 8/2000 |
| WO | 00/52906 | 9/2000 |
| WO | 00/62489 | 10/2000 |
| WO | 00/72528 | 11/2000 |
| WO | 00/79362 | 12/2000 |
| WO | 00/79730 | 12/2000 |
| WO | 01/06717 | 1/2001 |
| WO | 01/13585 | 2/2001 |
| WO | WO 02/033896 A3 | 4/2002 |

OTHER PUBLICATIONS

Paul Francis et al., "An Architecture for a Global Internet Host Distance Estimation Service", IEEE, Mar. 25, 1999, pp. 210-217.
Sami Iren et al., "The Transport Layer: Tutorial and Survery", XP-002210446, ACM Computing Surveys, vol. 31, No. 4, Dec. 1999, pp. 360-405.
D.B. Ingham et al., "Supporting Highly Manageable Web Services", Computer Networks and ISDN Systems 29 (1997), pp. 1405-1416.
J. Yu; "Scalale Routing Design Principles"; Ref. No. XP002191098, RFC 2791 Network Working Group; Jul. 31, 2000; pp. 1-24.
T. Bates et al., "Multiprotocol Extensions for BGP-4", XP-00219077, Jun. 2000, pp. 1-10.
S. Kumar et al., "The MASC/BGMP Architecture for Inter-domain Multicast Routing," 12 pages.
S. Berson et al., "An Architecture for Advance Reservations in the Internet," USC Information Sciences Institute, Jul. 16, 1998, pp. 1-21.
R. P. Draves et al., "Constructing Optimal IP Routing Tables," 1999 IEEE, 1-10.
R. Govindan et al., "An Analysis of Internet Inter-Domain Topology and Route Stability," USC Information Sciences Institute, 1997 IEEE, 8 pages.
V. Paxson, "Toward a Framework for Defining Internet Performance Metrics," http://www.isoc.org/inet96/proceedings/d3/d3_3.htm, pp. 1-20.
C. Alaettinoglu et al. "Routing Policy Specification Language (RPSL)," http://quimby.gnus.org/internet-drafts-ietf-rps-rpsl-v2-00.txt, pp. 1-56.
P. Traina, "BGP-4 Protocol Analysis," Mar. 1995, pp. 1-10.
B. Krishnamurthy et al., "On Network-Aware Clustering of Web Clients," 14 pages.
R. Govindan et al., "Heuristics for Internet Map Discovery", USC/Information Sciences Institute, pp. 1-11.
A. Feldmann et al., "Deriving Traffic Demands for Operational IP Networks: Methodology and Experience", pp. 1-14.
W. Richard Stevens, TCP/IP Illustrated vol. 1—The Protocols, "Chapter 21: TCP Timeout and Retransmission", Addison-Wesley Professional Computing Series, pp. 297-322.
Yasushi Saito et al., "Manageability, Availability and Performance in Porcupine: A Highly Scalable, Cluster-Based Mail Service", 17th ACM Symposium on Operating System Principles, pp. 1-15, Dec. 1999.
Nikolaos Skarmeas et al., "Content Based Routing as the Basis for Intra-Agent Communication", Department of Computing Imperial College London.
Nikolaos Skarmeas et al., "Intelligent Routing Based on Active Patterns as the Basis for the Integration of Distributed Information Systems", Department of Computing Imperial College London, Feb. 1997.
"A Longest Prefix Match Search Engine for Multi-Gigabit IP Processing", Masayoshi Kobayashi et al., C&C Media Research Laboratories, NEC Corporation, pp. 1360-1364, 2000 IEEE.
"Internet Protocol" from Nortel Networks, www.arvelo.net/net-bay-ip.html. Apr. 6, 2005, 26 pages.
Nick Feamster et al., "Controlling the Impact of BGP Policy Changes on IP Traffic", Nov. 6, 2001, pp. 1-18.
Dean Jones, "Developing Shared Ontologies in Multi-Agent Systems", pp. 1-10.
L. Massoulié et al., "Arguments in favour of admission control for TCP flows", pp. 1-16.

* cited by examiner

SYSTEMS AND METHODS FOR ROBUST, REAL-TIME MEASUREMENT OF NETWORK PERFORMANCE

CROSS REFERENCE TO RELATED APPLICATIONS

This application claims the benefit of U.S. Provisional Applications No. 60/241,450, filed Oct. 17, 2000 and No. 60/275,206, filed Mar. 12, 2001, which are hereby incorporated by reference in their entirety.

DESCRIPTION OF RELATED ART

The performance characteristics of routes in internetworks, such as the Internet, have been assessed in prior efforts. Statistical metrics of Internet performance include the characteristics of jitter, loss, and delay. Jitter may be characterized as the amount of variance in the time taken by packets traversing a path in a network. Delay indicates the amount of time taken for packets to traverse the path. And loss indicates the lossiness of the internetwork path.

Empirical observations have demonstrated that various combinations of these performance metrics are especially relevant to the performance of certain types of applications on the Internet. For instance, in some voice streaming applications such as Voice over IP (VoIP), appreciable levels of jitter may have a highly deleterious effect on performance, while some packet loss may be tolerable. In other applications, jitter and delay may be tolerable, while significant packet loss may be fatal.

Given the significance of such metrics to Internet performance, there is a need to measure such statistics in real-time for arbitrary end-points in an internetwork. The prior art also evinces a need to ensure that such statistics are robust, and based on substantial packet traffic.

SUMMARY OF THE INVENTION

Some embodiments of the invention include methods and apparatuses for obtaining delay, jitter, and loss statistics of a path between server and an end user coupled via an internetwork; in some embodiments, the server may comprise a web server in communication with the end user via the Internet. In some embodiments of the invention, these statistics are obtained by analyzing the details of a TCP connection underlying an HTML transaction. Some such embodiments ensure robust measurements of jitter, delay, and loss by maximizing traffic between the web server and the surfer in order to generate a robust sample of TCP connections.

In some such embodiments, content is updated with one or more HTML link(s). This existing content may reside on a highly trafficked portal, such as a web portal, and may be encoded in a markup language, such as Hyper Text Markup Language (HTML). The Uniform Resource Locators (URLs) corresponding to the one or more links resolve to the server from which the statistics are to be measured, i.e., the server which connects to the end user over the desired path. In some embodiments, this resolution may be based on an explicit relationship between a URL and a given measurement path. In alternative embodiments, the one or more URLs may resolve to an address which varies on each invocation, such that only the address, rather than the URL, connotes a relationship with the specific measurement path. A request for the connection comes into the server, and based on the target address, the outbound response is subsequently forced to a specific measurement path. In some embodiments of the invention, the actual content supplied by the server is minimized, in order to preserve bandwidth. In some embodiments, the content may be visually imperceptible, comprising one or more pixels, which may be transparent. In other embodiments, the content may comprise a visual artifact.

Some embodiments of the invention include a measurement subsystem which records observed call response times, which are used to record round trip times for packets traversing the path between the server and the end user. In some embodiments, these packets employ the TCP/IP protocol for their transport. In alternative embodiments, these measurements may be gathered at the end-user side, as opposed to the server side.

Some embodiments of the invention measure round trip times for different patterns of TCP messages sent within a TCP connection. In some embodiments, these measurements of round trip times are converted into measurements of jitter, loss, or delay along the desired path. In some embodiments of the invention, jitter, loss, and delay statistics may be inferred by groups, or classes, of end user addresses. These and other embodiments are further described herein.

DETAILED DESCRIPTION

Distributing Hits to the Desired Server

Figure 1:
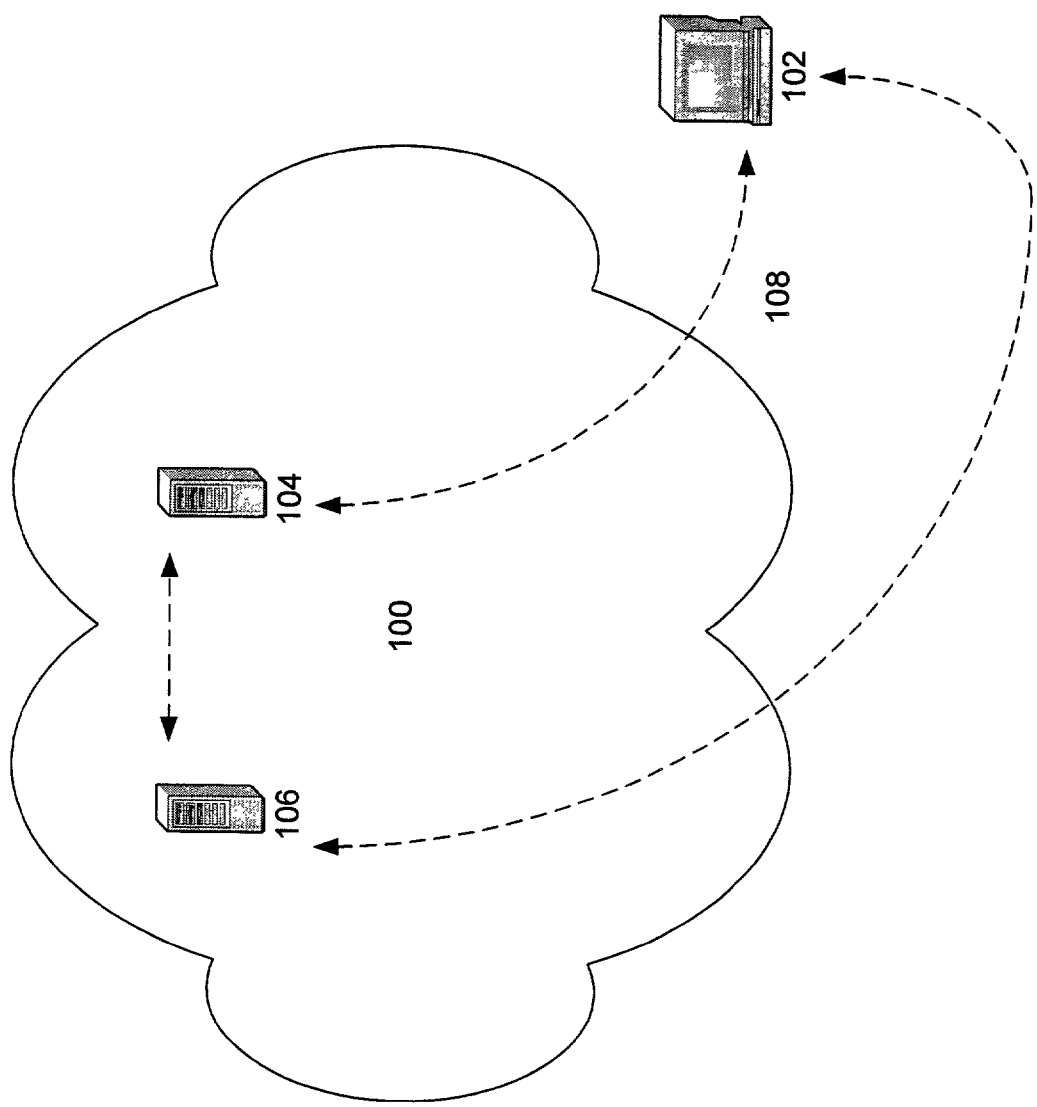
FIG. 1 illustrates an architecture used to redirect internetwork traffic to a measurement server according to some embodiments of the invention.

Some embodiments of the invention include systems and methods to maximize traffic through a desired path, in order to generate a robust number of measurements of round trip times through the path. These embodiments are illustrated schematically in FIG. 1. The method generates traffic towards an end user 102, or surfer. An internetwork 100 includes a measured server 104, which is the server from which traffic is to be measured, and a highly trafficked portal 106. The highly trafficked portal 106 may include content from a popular commercial web site. The measured server 104 and the end user 102 can communicate via the internetwork through one or more paths 108. Some embodiments attempt to divert traffic from the portal 106 to the measured server 104, in order to ensure robust measurements of network performance along the one or more paths 108.

In some such embodiments, a content object is included in the portal 106, so that when an end user 102 connects to the portal 106, her request is redirected to the measured server 104 in order to receive the portion of content. This content object may be referred to as a webby. In some embodiments of the invention, the webby is designed to occupy a minimal amount of bandwidth. In some embodiments, the webby is designed to be imperceptible. In a non-limiting implementation of the webby, the content object may comprise a transparent GIF or JPEG, which includes one or more pixels. Other implementations of the content object will be apparent to those skilled in the art.

In web based embodiments, when a surfer's browser 102 requests the content object, the browser 102 performs a DNS lookup, and retrieves an IP address for the web object; this IP address resolves to the measured server 104. In some embodiments of the invention, by supplying varying answers for the IP address, hits may be distributed across many measured servers 104. In response to the request, the measured server 104 delivers the content object to the surfer's browser 102.

Measuring Round Trip Times

Some embodiments of the invention measure Round Trip Times (RTTs) between the measured server 104 and end users 102 in order to generate metrics of path performance; these metrics may, by way of non-limiting example, include jitter, delay, and loss statistics. In some embodiments of the invention, different algorithms for measuring RTTs are employed, contingent upon the type of session that is witnessed. As such, several types of TCP sessions are described herein, followed by a discussion of the RTT measurement techniques that may be employed for the various sessions. Note that the discussion that follows employs acronyms described in Table 1 below:

TABLE 1

Acronyms used in the description of TCP patterns

| | |
|---|---|
| Si | SYN received by the webby (i.e., incoming SYN) |
| So | SYN/ACK sent by the webby |
| Pi | PUSH packet received by the webby |
| Po | PUSH packet sent by the webby |
| Fi | FIN message received by the webby |
| Fo | FIN message sent by the webby |
| .i | ACK message received by the webby |
| .o | ACK message sent by the webby |

Figure 2:
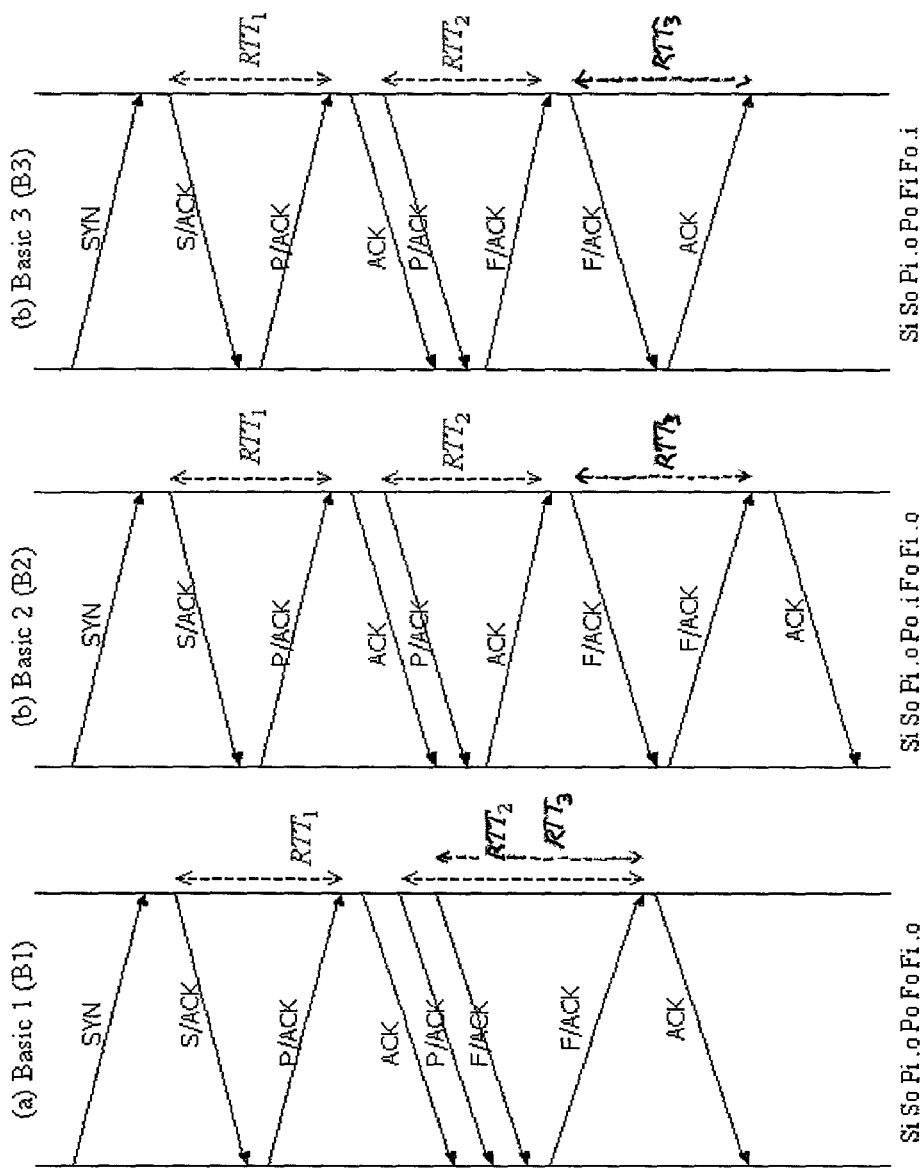
FIG. 2 illustrates techniques used to measure Round Trip Times for various types of TCP sessions according to some embodiments of the invention.

FIG. 2 illustrates three types of sessions 200 202 204 that may be witnessed between the measured server 104 and the end user, or surfer 102. These patterns are hereafter referred to as Basic Pattern 1 (B1) 200, Basic Pattern 2 (B2) 202, and Basic Pattern 3 (B3) 204. The differences between patterns B1 on one hand, B2 and B3 on the other, inheres in the manner in which TCP behaves on the side of the webby, i.e., the measured server 104. In the case of B1 200, the actions performed by the webby 104 upon the receipt of a PUSH packet (i.e., Pi) are as follows:

The webby 104 sends an ACK packet acknowledging the PUSH.

The webby 104 sends the requested data in a PUSH packet.

The webby 104 subsequently terminates the connection by sending a FIN message.

For cases B2 202 and B3 204, the actions performed by the webby 104 upon the receipt of a PUSH packet (i.e., Pi) are as follows:

The webby 104 sends an ACK packet acknowledging the PUSH

The webby 104 sends the requested data in a PUSH packet

The webby 104 subsequently waits for an acknowledgment from the surfer 102 containing notification of receipt of the data before the webby 104 proceeds with sending a FIN.

In some embodiments of the invention, Round Trip Times $RTT_1$, $RTT_2$ and $RTT_3$ are computed by use of the same algorithm in all cases 200 202 204. In some such embodiments, $RTT_1$ may be determined simply by waiting for an ACK corresponding to the first SYN/ACK. In some embodiments, $RTT_2$ may be measured by starting a timer at the instant the first PUSH is sent by the webby 104 (as for $RTT_1$, the timer is started at the first PUSH to take into account the effect of timeouts), and stopping the timer upon the receipt of the first packet acknowledging the PUSH that was sent. (This packet acknowledges a sequence number at least equal to that of the PUSH message). A similar technique may be applied to $RTT_3$, this time to the FIN packet sent by the webby 104. As discussed in U.S. Provisional Applications No. 60/241,450, filed Oct. 17, 2000 and No. 60/275,206, filed Mar. 12, 2001, which are hereby incorporated by reference in their entirety, these techniques for measuring Round Trip Times have been empirically shown to be robust in all manner of complex TCP transactions.

Computation of Jitter, Loss, and Delay from Round Trip Times

In some embodiments of the invention, a measurements listener receives values of $RTT_1$, $RTT_2$, and $RTT_3$ that correspond to a given IP address. In some embodiments, the measurements listener may comprise one or more processes distributed on one or more servers coupled to the internetwork. These measurements are sent to a module that performs one or more of the following steps:

Compute the values of round-trip time d, jitter v, and packet loss p for this measurement instance.

Map the IP address to a corresponding group of IP addresses (this group may comprise an Equivalence Class.

Update the values of $\hat{d}$, $\hat{v}$, $\hat{p}$, using old values of $\hat{d}$, $\hat{v}$, $\hat{p}$ and the values of d, v, and p, wherein $\hat{d}$, $\hat{v}$, $\hat{p}$ comprise weighted averages of delay, jitter, and loss, respectively).

Non-limiting implementations for calculating d, v, and p from the Round Trip Times are described herein. First, note that $RTT_1$ and $RTT_3$ do not overlap in some embodiments. Hence, network events that are captured by the first round trip time $RTT_1$ are typically not captured by $RTT_3$. Empirical observations also demonstrate that $RTT_1$ and $RTT_3$ are often very different. As such, some embodiments of the invention employ a difference between $RTT_1$ and $RTT_3$ to capture network oscillations in performance, i.e. jitter. In one such embodiment the jitter, v is set to the absolute value of the difference, i.e., $$v = |RTT_3 - RTT_1|$$

Empirical observations also demonstrate that $RTT_2$ and $RTT_3$ may be highly correlated. As such, in some embodiments of the invention a difference between $RTT_2$ and $RTT_3$ may be used to infer packet loss. In case $RTT_3$ is not measured, a large difference between $RTT_1$ and $RTT_2$ may be used to infer packet loss in extreme cases, for example when $RTT_1$ is close to 0, and $RTT_2$ has a value on or about 3 seconds. Otherwise, a difference between $RTT_2$ and $RTT_3$ that is close to 3 or 6 seconds may be used in some embodiments of the invention, to declare packet loss. Thus, to determine loss, some embodiments of the invention employ one or more of the following steps:

If either $RTT_1$ or $RTT_2$ is small (for example, less than 500 ms), compute the difference between $RTT_1$ and $RTT_2$: if this difference is on or about 3 seconds or 6 seconds, set p to 1.

If either $RTT_1$ or $RTT_2$ is large (for example, more than 500 ms), compute the difference between $RTT_2$ and $RTT_3$: if this difference is on or about 3 seconds or 6 seconds, set p to 1.

Otherwise set p to 0.

In some embodiments of the invention, d is set to an average of the true RTTs measured for a transaction. In case p is set to 0, this is simply the average of all three RTTs. In case p is set to 1, the packet involved in the loss should be removed from the computation of the average d. (Alternatively, a 3 second timeout can be subtracted from the measured RTT for that packet.)

As will be apparent to those skilled in the art, the implementations described are non-limiting techniques for computing d, v, and p from Round Trip Times; other implementations will be apparent to those skilled in the art.

Computing Weighted Averages of Jitter, Delay, and Loss

Some embodiments of the invention include techniques for maintaining weighted averages of Delay, Jitter, and Loss, $\hat{d}$, $\hat{v}$, and $\hat{p}$ respectively. In some such embodiments, current values of d, v, and p values as well as previous values of $\hat{d}$, $\hat{v}$, and $\hat{p}$ for a relevant group of IP addresses are used to compute the new values for $\hat{d}$, $\hat{v}$, and $\hat{p}$.

In a non-limiting example, weighted moving averages are used to compute $\hat{d}$, $\hat{v}$, and $\hat{p}$ $$\hat{d}_{new} = \alpha \hat{d}_{old} + (1-\alpha)d$$
$$\hat{v}_{new} = \beta \hat{v}_{old} + (1-\beta)v$$
$$\hat{p}_{new} = \gamma \hat{p}_{old} + (1-\gamma)p$$

In some embodiments, $\alpha$, $\beta$, and $\gamma$, are fixed constants. In some such embodiments, the combination of values used for $\alpha$, $\beta$, and $\gamma$ are determined by the type of application the TCP session is supporting. These applications may include, but are not limited to, any one or more of HTTP 1.0, HTTP 1.1, Voice over IP, or Video streaming over IP. Examples of values of $\alpha$, $\beta$, and $\gamma$ that may be used for these applications are presented below in an XML format. Note that these examples also include sample values for parameters denoted theta, phi, omega, and psi; these parameters may be used to convert the tuples ($\alpha$, $\beta$, and $\gamma$) into a scalar performance score; these parameters are further described in U.S. Provisional Applications No. 60/241,450, filed Oct. 17, 2000 and No. 60/275,206, filed Mar. 12, 2001, which are hereby incorporated by reference in their entirety. The values presented herein are for illustration only; other value combinations will be apparent to those skilled in the art:

HTTP 1.0

<module><engine slot="1"><application model="http1.0" [alpha="0.9" beta="0.9" gamma="0.9" theta="1.18" phi="0.13" omega="0.15" psi="0.25"]/></engine></module>

HTTP 1.1

<module><engine slot="1" ><application model="http1.1" [alpha="0.9" beta="0.9" gamma="0.9" theta="1.3" phi="0.31" omega="0.41 " psi="1.0"]/> </engine></module>

Voice over IP

<module><engine slot="1" ><application model="voice" [alpha="0.9" beta="0.9"gamma="0.9" theta ="1.5" phi="6.0" omega="23.0" psi="0.0"]/></engine></module>

Video Streaming

<module><engine slot="1" ><application model="video" [alpha="0.9" beta="0.9"gamma="0.9" theta="1.0" phi="4.0" omega="69.0" psi="0.0"]/></engine></module>

In some embodiments of the invention, time-decaying values of $\alpha$, $\beta$, and $\gamma$ may be employed. In some such embodiments, these values of $\alpha$, $\beta$, and $\gamma$ may decay exponentially, i.e., $$\alpha = \exp(-k_\alpha T)$$
$$\beta = \exp(-k_\beta T)$$
$$\gamma = \exp(-k_\gamma T)$$

Other value combinations for $\alpha$, $\beta$, and $\gamma$ shall be apparent to those skilled in the art.

Conclusion

The various techniques presented above for measuring Round Trip Times and determining jitter, loss, and delay values are presented for illustrative purposes only. Many equivalent techniques shall be apparent to those skilled in the art.

The invention claimed is:

1. A method of measuring a performance of a route in an internetwork, the route coupling an internetwork server to a terminal on the internetwork, the method comprising:
   at a frequently trafficked portal on the internetwork, detecting a request for a web page from the terminal, wherein the web page is at least partially stored at the frequently trafficked portal;
   in response to the request for the web page, downloading the web page to the terminal via the internetwork;
   from the web page, retrieving a Uniform Resource Locator (URL) for a web object referenced in the web page;
   resolving the URL to the internetwork server;
   detecting a request for the web object from the terminal at the internetwork server; in response to the request for the web object, sending the web object from the internetwork server to the terminal;
   concurrent with sending the web object, measuring a Round Trip Time (RTT) from the transmission and reception of corresponding transport protocol packets sent between the internetwork server and the terminal; and
   calculating, at least from the RTT, parameters of at least part of the internetwork, wherein the parameters comprise delay, jitter, and loss.

2. The method of claim 1, wherein the web page is at least partially encoded in a markup language.

3. The method of claim 2, wherein the markup language is Hyper Text Markup Language.

4. The method of claim 3, wherein the sending the web object from the internetwork server to the terminal is performed via a Hyper Text Transfer Protocol (HTTP).

5. The method of claim 4, wherein the Hyper Text Transfer Protocol is HTTP v 1.0.

6. The method of claim 4, wherein the Hyper Text Transfer Protocol is HTTP v 1.1.

7. The method of claim 1, wherein the web object is visually imperceptible.

8. The method of claim 1, wherein the web object comprises a single pixel.

9. A system for measuring performance of an internetwork, the system comprising:
   a frequently trafficked web portal in the internetwork;
   a web page for downloading upon request and at least partially stored on the frequently trafficked web portal, the at least partially stored web page including a Uniform Resource Locator (URL) for a web object, such that the web object is not stored on the frequently trafficked web portal;

a Domain Name System (DNS) server on the internetwork, the DNS server including a reference for mapping the URL for the web object to an Internet Protocol address for an internetwork server on the internetwork;

a web browser coupled to the internetwork, wherein the web browser is configured to send a download request for the web object to the internetwork server;

a measurement process executed on the internetwork server, such that in response to the download request, the measurement process for measuring one or more Round Trip Times from the transmission and reception of corresponding transport protocol packets sent between the internetwork server and the web browser; and a module for calculating, at least from the one or more Round Trip Times, parameters of at least part of the internetwork, wherein the parameters comprise delay, jitter, and loss.

10. The system of claim 9, wherein the web page is at least partially encoded in a markup language.

11. The system of claim 9, wherein the markup language is Hyper Text Markup Language (HTML).

12. A method of measuring a performance of a route in an internetwork, the route coupling an internetwork server to a terminal on the internetwork, the method comprising:

at a frequently trafficked portal on the internetwork, detecting a request for a web page from the terminal, wherein the web page is at least partially stored at the frequently trafficked portal;

from the web page, retrieving a Uniform Resource Locator (URL) for a web object referenced in the web page;

resolving the URL to the internetwork server;

detecting a request for the web object from the terminal at the internetwork server;

in response to the request for the web object, measuring a Round Trip Time (RTT) from the transmission and reception of corresponding transport protocol packets sent between the internetwork server and the terminal; and in response to the request for the web object and concurrent with measuring the RTT, sending the web object from the internetwork server to the terminal; and calculating, at least from the RTT, parameters of at least part of the internetwork, wherein the parameters comprise delay, jitter, and loss.

\* \* \* \* \*

UNITED STATES PATENT AND TRADEMARK OFFICE
CERTIFICATE OF CORRECTION

| | | |
|---|---|---|
| PATENT NO. | : 7,363,367 B2 | Page 1 of 1 |
| APPLICATION NO. | : 09/903423 | |
| DATED | : April 22, 2008 | |
| INVENTOR(S) | : Michael A. Lloyd et al. | |

It is certified that error appears in the above-identified patent and that said Letters Patent is hereby corrected as shown below:

At column 4, line 27 replace "Class." with --Class).--

At column 4, line 39 replace "RTT," with --$RTT_1$--

At column 4, line 48 replace "RTT," with --$RTT_1$--

At column 4, line 51 replace "RTT," with --$RTT_1$--

Signed and Sealed this

Nineteenth Day of August, 2008

JON W. DUDAS
*Director of the United States Patent and Trademark Office*